US008347203B1

(12) United States Patent
Setiawan et al.

(10) Patent No.: US 8,347,203 B1
(45) Date of Patent: Jan. 1, 2013

(54) METHODS AND SYSTEMS FOR DEFINING A FORM NAVIGATIONAL STRUCTURE

(75) Inventors: Edy Setiawan, Irving, TX (US); Amit Singh, Irving, TX (US); Fariborz Ebrahimi, Arlington, VA (US)

(73) Assignee: Verizon Data Services LLC, Temple Terrace, FL (US)

( * ) Notice: Subject to any disclaimer, the term of this patent is extended or adjusted under 35 U.S.C. 154(b) by 976 days.

(21) Appl. No.: 11/252,566

(22) Filed: Oct. 19, 2005

Related U.S. Application Data (63) Continuation-in-part of application No. 10/898,110, filed on Jul. 23, 2004, and a continuation-in-part of application No. 10/898,111, filed on Jul. 23, 2004, and a continuation-in-part of application No. 10/897,744, filed on Jul. 23, 2004.

(51) Int. Cl.
*G06F 17/00* (2006.01)

(52) U.S. Cl. ......... 715/222; 715/221; 715/223; 715/234

(58) Field of Classification Search .......... 715/221–223, 715/234
See application file for complete search history.

(56) References Cited

U.S. PATENT DOCUMENTS

| | | | |
|---|---|---|---|
| 5,428,694 A | 6/1995 | Betts et al. | |
| 5,704,029 A * | 12/1997 | Wright, Jr. | 715/223 |
| 5,809,497 A | 9/1998 | Freund et al. | |
| 5,911,143 A | 6/1999 | Deinhart et al. | |
| 6,161,139 A | 12/2000 | Win et al. | |
| 6,223,184 B1 | 4/2001 | Blackman et al. | |
| 6,289,333 B1 | 9/2001 | Jawahar et al. | |
| 6,308,173 B1 | 10/2001 | Glasser et al. | |
| 6,314,415 B1 | 11/2001 | Mukherjee | |
| 6,380,954 B1 * | 4/2002 | Gunther | 715/764 |
| 6,430,571 B1 | 8/2002 | Doan et al. | |
| 6,460,141 B1 | 10/2002 | Olden | |
| 6,473,769 B1 | 10/2002 | Andrew et al. | |
| 6,535,883 B1 * | 3/2003 | Lee et al. | 707/100 |
| 6,662,231 B1 | 12/2003 | Drosset et al. | |
| 6,816,906 B1 | 11/2004 | Icken et al. | |
| 6,931,402 B1 | 8/2005 | Pereira | |
| 6,976,078 B1 | 12/2005 | Icken et al. | |
| 6,985,953 B1 | 1/2006 | Sandhu et al. | |
| 7,010,760 B2 * | 3/2006 | Arnstein et al. | 715/853 |
| 7,089,319 B2 | 8/2006 | Lysenko et al. | |
| 7,117,504 B2 | 10/2006 | Smith et al. | |
| 7,185,044 B2 | 2/2007 | Ryan et al. | |
| 7,240,360 B1 * | 7/2007 | Phan | 726/2 |
| 7,246,320 B2 * | 7/2007 | Foucher et al. | 715/739 |
| 7,404,140 B2 | 7/2008 | O'Rourke | |

(Continued)

OTHER PUBLICATIONS

"Index of /candan/papers" [http:/aria.asu.edu/candan/papers], downloaded on Oct. 2, 2007.

(Continued)

*Primary Examiner* — Thu V Huynh (57) ABSTRACT

Systems and methods for defining a form navigational structure associated with at least one node in a process flow may comprise selecting a node form for the at least one node in the process flow, the node form identifying a plurality of displayable forms. Furthermore, the systems and methods may include defining a plurality of node steps for the node, each node step corresponding to a displayable screen associated with a subset of the plurality of displayable forms. Moreover, the systems and methods may include establishing a hierarchical tree structure associating the plurality of node steps, branches in the hierarchical tree structure having associated validation rules.

24 Claims, 6 Drawing Sheets

U.S. PATENT DOCUMENTS

| | | | |
|---|---|---|---|
| 7,899,867 B1 | 3/2011 | Sherstinsky et al. | |
| 2001/0054064 A1 | 12/2001 | Kannan | |
| 2002/0032596 A1 | 3/2002 | Ohsaki et al. | |
| 2002/0040352 A1 | 4/2002 | McCormick | |
| 2002/0087383 A1 | 7/2002 | Cogger et al. | |
| 2002/0147743 A1 | 10/2002 | Le et al. | |
| 2002/0180789 A1* | 12/2002 | Guttmann et al. | 345/760 |
| 2003/0018725 A1 | 1/2003 | Turner et al. | |
| 2003/0036940 A1 | 2/2003 | Leymann et al. | |
| 2003/0084401 A1* | 5/2003 | Abel et al. | 715/501.1 |
| 2003/0110443 A1* | 6/2003 | Yankovich et al. | 715/501.1 |
| 2003/0233296 A1 | 12/2003 | Wagner | |
| 2004/0010502 A1 | 1/2004 | Bomfim et al. | |
| 2004/0064783 A1 | 4/2004 | Braun et al. | |
| 2004/0078105 A1 | 4/2004 | Moon et al. | |
| 2004/0078446 A1 | 4/2004 | Daniell et al. | |
| 2004/0083426 A1 | 4/2004 | Sahu | |
| 2004/0181513 A1 | 9/2004 | Henderson et al. | |
| 2004/0205529 A1 | 10/2004 | Poulose et al. | |
| 2004/0236655 A1 | 11/2004 | Scumniotales et al. | |
| 2004/0255252 A1* | 12/2004 | Rodriguez et al. | 715/762 |
| 2005/0005259 A1* | 1/2005 | Avery et al. | 717/103 |
| 2005/0010547 A1 | 1/2005 | Carinci et al. | |
| 2005/0060167 A1 | 3/2005 | Patron et al. | |
| 2005/0187781 A1 | 8/2005 | Christensen | |
| 2005/0235034 A1 | 10/2005 | Chen et al. | |
| 2005/0257045 A1 | 11/2005 | Bushman et al. | |
| 2006/0080130 A1 | 4/2006 | Choksi et al. | |
| 2006/0101098 A1 | 5/2006 | Morgan et al. | |
| 2006/0101119 A1 | 5/2006 | Qureshi et al. | |
| 2007/0016641 A1 | 1/2007 | Broomhall | |
| 2007/0214001 A1 | 9/2007 | Patron et al. | |
| 2008/0086564 A1 | 4/2008 | Putman et al. | |
| 2008/0126988 A1* | 5/2008 | Mudaliar | 715/825 |
| 2008/0127032 A1* | 5/2008 | Mital et al. | 717/100 |

OTHER PUBLICATIONS

K. Candan and W. Li, "Integration of Database and Internet Technologies for Scalable End-to-end E-commerce Systems" [http:/aria.asu.edu/candan/papers/06chap.pdfj, Idea Group Publishing, 2003, pp. 84-112.

Stokes, David , "Implementing online chat in a Web Portal", www.ibm.com/developerworks/ibm/libraryi-portalchat/ May 1, 2003, 17.

Instant Messaging as a Business Tool, IPSwitch Instant Messaging, Retrieved from the www.waybackmachine.org of site www.ipswitch.net, published Dec. 7, 2004, pp. 1-6.

* cited by examiner

METHODS AND SYSTEMS FOR DEFINING A FORM NAVIGATIONAL STRUCTURE

CROSS REFERENCE TO RELATED APPLICATIONS

This application is a continuation-in-part of U.S. application Ser. No. 10/898,110 filed Jul. 23, 2004 and entitled METHODS AND SYSTEMS FOR PROVIDING CAPABILITY MANAGEMENT AND USER ADMINISTRATION; U.S. application Ser. No. 10/898,111 filed Jul. 23, 2004 and entitled METHODS AND SYSTEMS FOR PROVIDING DATA FORM MANAGEMENT; and U.S. application Ser. No. 10/897,744 filed Jul. 23, 2004 and entitled METHODS AND SYSTEM FOR PROVIDING A DATA ACCESS LAYER, each assigned to the assignee of the present application, the disclosures of which are expressly incorporated herein by reference.

This application is related to U.S. patent application Ser. No. 11/252,606, filed on even date herewith in the name of Edy Setiawan et al. and entitled METHODS AND SYSTEMS FOR PROVIDING PROCESS FLOW MANAGEMENT; U.S. patent application Ser. No. 11/252,544, filed on even date herewith in the name of Akash Jain et al. and entitled METHODS AND SYSTEMS FOR INTEGRATING A MESSAGING SERVICE WITH AN APPLICATION; and U.S. patent application Ser. No. 11/252,543, filed on even date herewith in the name of Akash Jain et al. et al. and entitled METHODS AND SYSTEMS FOR PROVIDING A MESSAGING SERVICE, each assigned to the assignee of the present application, the disclosures of which are expressly incorporated herein by reference.

TECHNICAL FIELD

The present invention generally relates to defining a form navigational structure. More particularly, the present invention relates to defining a form navigational structure associated with at least one node in a process flow.

BACKGROUND INFORMATION

Conventional office automation suites do not enable developers to easily define display rules, establish screen display methods, or define screen navigation paths for forms. For example, they do not enable developers to define which form should be displayed in the current screen and in following screens. As a result, additional development efforts are required to provide these functionalities. These additional development efforts can involve extensive hard coding and development time for each form in order to meet business needs.

Furthermore, conventional office automation suites containing forms modules are not integrated with other components related to general business rules. Consequently, problems arise whenever business rules are changed or when an application is expanded. For example, additional dynamic or static pages may need to be created according to changing business rules. Although many form controller applications currently available can help developers design form navigation, they cannot dynamically control the navigation flow of screens by the values entered into the fields or by user profile structures.

Moreover, conventional office automation suites are not integrated with process flow or roles-based structures and do not include granular functions that can be defined in different flow models. In addition, conventional office automation suites are not 100% web-based. In contrast, they require some custom applications to be installed on a developer's desktop or they require the developer to design the forms. Furthermore, after a developer designs the form flow, it still has to be deployed to production through the traditional change deployment process.

Thus, there is a need for improved systems and methods for defining a form navigational structure. For instance, there is a need for defining a form navigational structure associated with at least one node in a process flow.

SUMMARY OF THE INVENTION

Consistent with embodiments of the present invention, systems and methods are disclosed for defining a form navigational structure.

In one aspect, a method for defining a form navigational structure associated with at least one node in a process flow comprises selecting a node form for the at least one node in the process flow, the node form identifying a plurality of displayable forms, defining a plurality of node steps for the node, each node step corresponding to a displayable screen associated with a subset of the plurality of displayable forms, and establishing a hierarchical tree structure associating the plurality of node steps, branches in the hierarchical tree structure having associated validation rules.

In another aspect, a system for defining a form navigational structure associated with at least one node in a process flow comprises a memory storage for maintaining a database and a processing unit coupled to the memory storage, wherein the processing unit is operative to select a node form for the at least one node in the process flow, the node form identifying a plurality of displayable forms, define a plurality of node steps for the node, each node step corresponding to a displayable screen associated with a subset of the plurality of displayable forms, and establish a hierarchical tree structure associating the plurality of node steps, branches in the hierarchical tree structure having associated validation rules.

In yet another aspect, a computer-readable medium comprises a set of instructions which when executed perform a method for defining a form navigational structure associated with at least one node in a process flow, the method comprising selecting a node form for the at least one node in the process flow, the node form identifying a plurality of displayable forms, defining a plurality of node steps for the node, each node step corresponding to a displayable screen associated with a subset of the plurality of displayable forms, and establishing a hierarchical tree structure associating the plurality of node steps, branches in the hierarchical tree structure having associated validation rules.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

The following detailed description refers to the accompanying drawing. Wherever possible, the same reference numbers are used in the drawing and the following description to refer to the same or similar parts. While a presently preferred embodiment and features of the invention are described herein, modifications, adaptations and other implementations are possible, without departing from the spirit and scope of the invention. For example, substitutions, additions or modifications may be made to the components illustrated in the drawing, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with the invention may provide a completely network-based form controller for defining a form's navigational structure based on business rules. After completion, the form's navigational structure may be automatically stored in a database. The form controller may comprise a module that handles the display sequence of forms on a specific node and may be used during the design of the process flow.

Consistent with embodiments of the invention, forms may comprise the building blocks for constructing a ticket. A form can contain one or multiple fields. For example, a customer information form may have a customer name, customer address, and city. A node may comprise a point in a ticket routing where human intervention or action may take place. A node can be associated with the originator of the path(s), for example, a node can have one or more originator paths.

In addition, a node form may have one or more forms that may be defined at the node level. The node form level may define, on the particular node, if form navigation (node step) is needed. Node form access options for each node may be any one of the following: i) 1=create new; ii) 2=edit; iii) 3=view; and iv) 4=special (partial view/partial edit).

Furthermore, a node step may be associated with a subset of forms (one or more forms) that are associated with a specific node in the process flow. A node step may comprise the navigation of the forms for a specific node. A node form access may comprise the access level of a form at a node. Node form access at each node may be any one of the following: i) 1=create new; ii) 2=edit; iii) 3=view; and iv) 4=special (partial view/partial edit).

Moreover, node step form access may comprise the access level of a form at a node on a certain branch/navigation tree. Node step form access at each navigation tree may be any one of the following: i) 1=create new; ii) 2=edit; iii) 3=view; and iv) 4=special (partial view/partial edit).

An embodiment consistent with the invention may comprise a system for defining a form navigational structure. The system may comprise a memory storage for maintaining a database and a processing unit coupled to the memory storage. The processing unit may be operative to select a node form for the at least one node in the process flow, the node form identifying a plurality of displayable forms. Furthermore, the processing unit may be operative to define a plurality of node steps for the node, each node step corresponding to a displayable screen associated with a subset of the plurality of displayable forms. Moreover, the processing unit may be operative to establish a hierarchical tree structure associating the plurality of node steps, branches in the hierarchical tree structure having associated validation rules.

Figure 1:
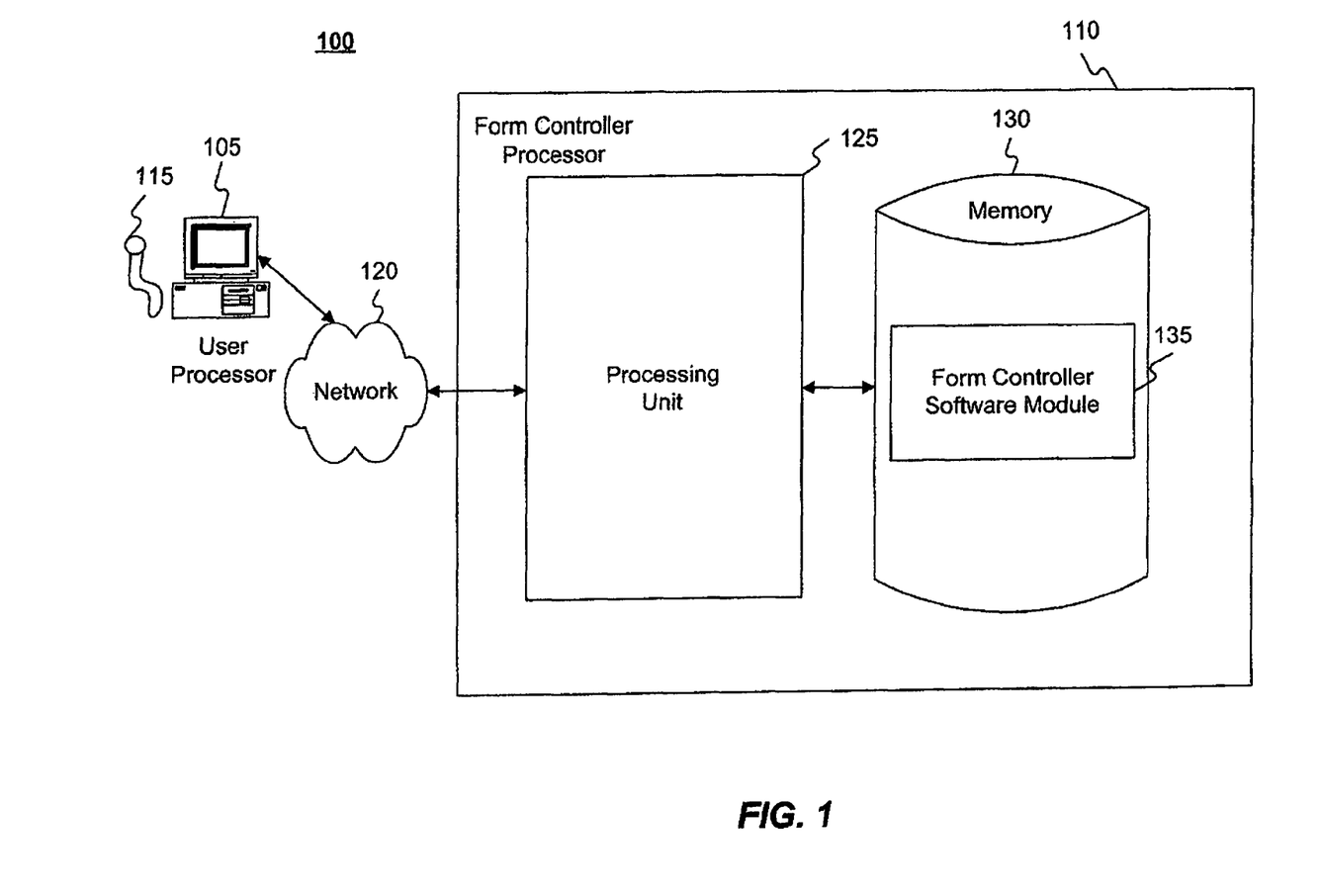
FIG. 1 is a functional block diagram of an exemplary system for defining a form navigational structure consistent with an embodiment of the present invention.

Consistent with an embodiment of the present invention, the aforementioned memory, processing unit, and other components may be implemented in a form controller system, such as the exemplary form controller system 100 of FIG. 1. Any suitable combination of hardware, software and/or firmware may be used to implement the memory, processing unit, or other components. By way of example, the memory, processing unit, or other components may be implemented with a form controller processor 110 in combination with system 100. The aforementioned system and device are exemplary and other systems and devices may comprise the aforementioned memory, processing unit, or other components, consistent with embodiments of the present invention.

By way of a non-limiting example, FIG. 1 illustrates system 100 in which the features and principles of the present invention may be implemented. As illustrated in the block diagram of FIG. 1, system 100 may include a user processor 105 operated by a user 105, a network 120, and form controller processor 110. Form controller processor 110 may include a processing unit 125 and a memory 130. Memory 130 may include a form controller software module 135 that, when executed on processing unit 125, causes form controller processor 110 to carry out various embodiments consistent with the invention.

User processor 105 and form controller processor 110 ("the processors") included in system 100 may be implemented using a personal computer, network computer, mainframe, or other similar microcomputer-based workstation. The processors may, though, comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may include any data network, such as, for example, an existing secure credit network, a local area network (LAN), a wide area network (WAN), a public telephone switching network, an automated clearing house (ACH) network, or a wide area network, such as the Internet. LAN or WAN networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to ensure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 120. These methods and processes may include, but are not limited to, transferring data via, diskette, CD ROM, facsimile, conventional mail, an interactive voice response system (IVR), or via voice over a publicly switched telephone network.

Figure 2:
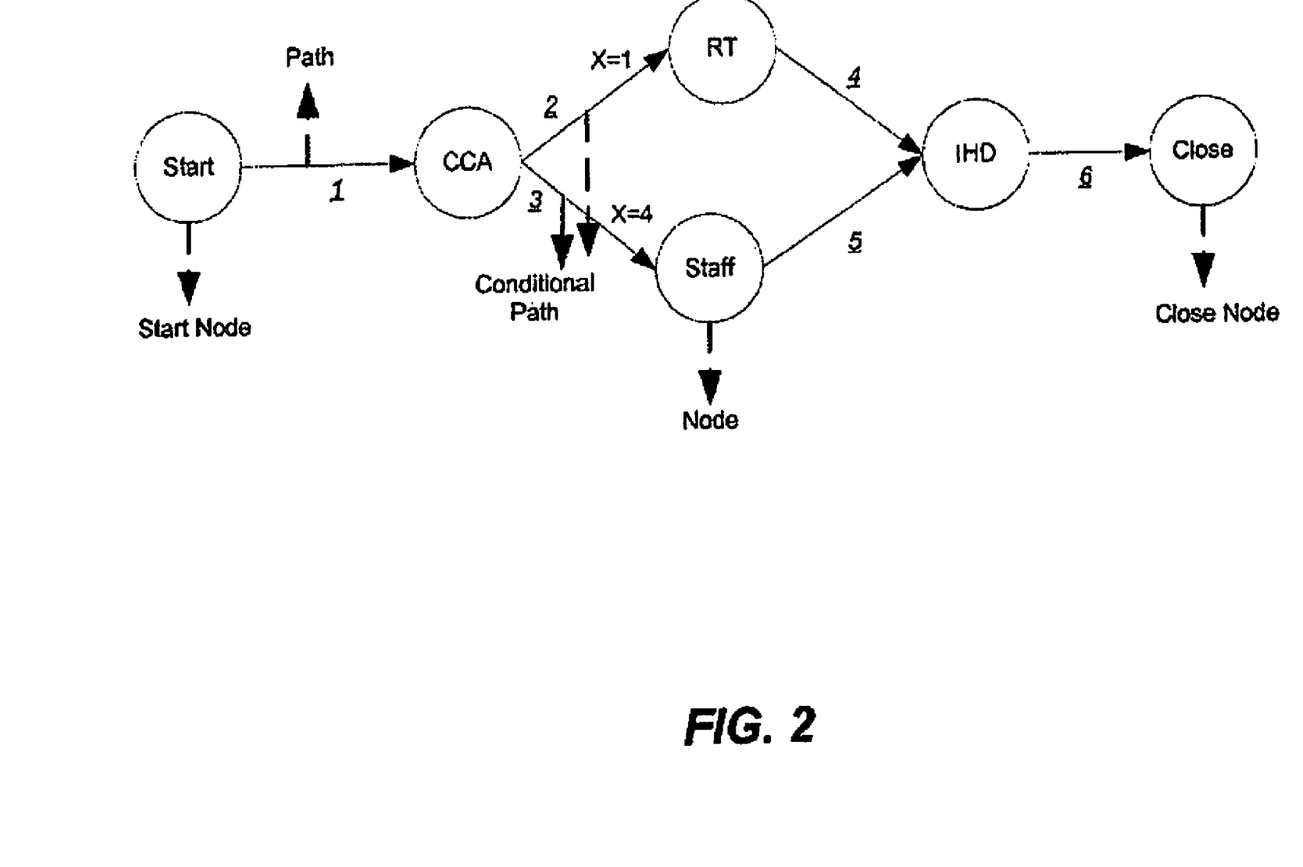
FIG. 2 is a diagram that illustrates a exemplary node form access and node form status consistent with an embodiment of the present invention.

FIG. 2 illustrates an exemplary node form access. For example, the ticket may comprise an incoming request for Internal Help Desk (offline department) ("IHD"). The ticket may have only two forms, the Customer Info form and Tax form. If an IHD user decides to complete the ticket by adding a new IHD Resolution form to the ticket, then the node form access may include the information shown in Table 1. Note that IHD may be the originator node for path 6 in this example.

TABLE 1

| Node | Form Name | Node Form Access Level |
|---|---|---|
| 6 | Customer info | 3 => (view) |
| 6 | Tax | 2 => (edit) |
| 6 | Resolution | 1 => (create new) |

FIG. 2 also illustrates an exemplary node form status. For example, the ticket, which may comprise an incoming requests for IHD, may be two forms, customer info and tax forms. Table 2 describes the forms' node form status at that node. Note that IHD may is the originator node for path 6 in this example.

TABLE 2

| Node | Form Name | Node Form Status |
|---|---|---|
| 6 | Customer info | 2 => (incoming) |
| 6 | Tax | 2 => (incoming) |
| 6 | Resolution | 2 => (incoming) |

Figure 3:
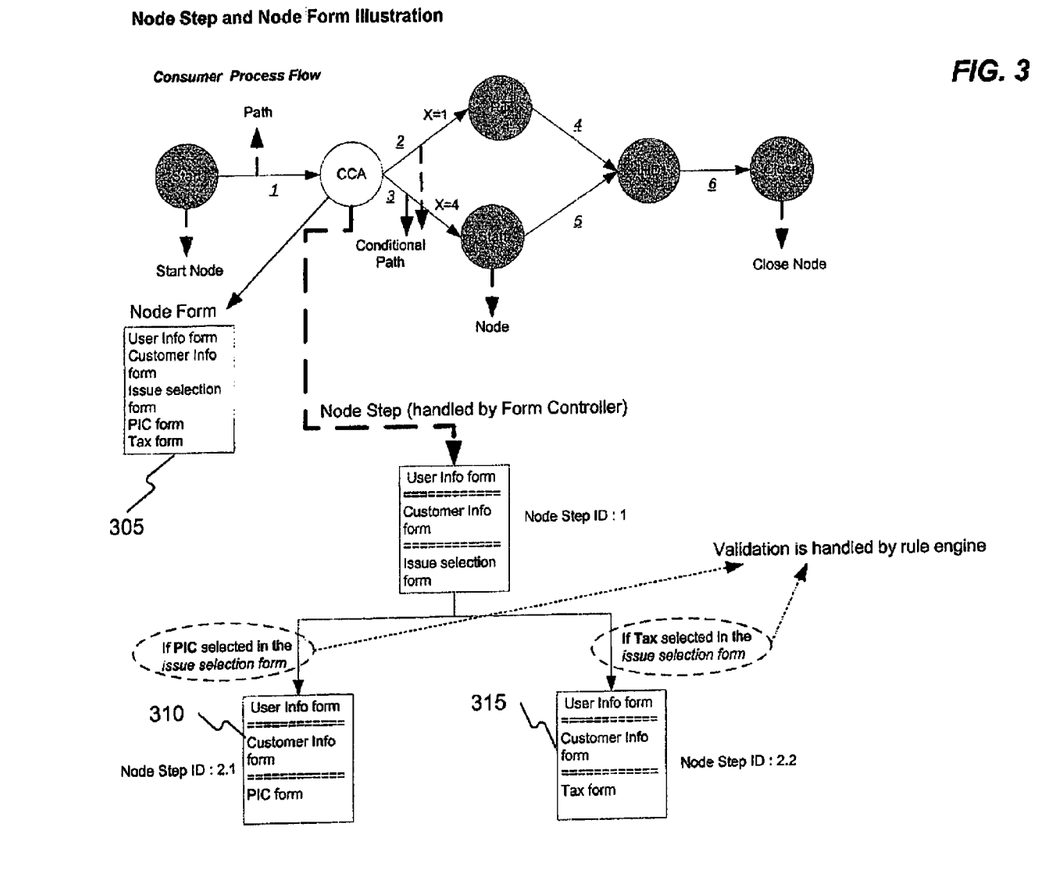
FIG. 3 is a diagram that illustrates a exemplary node step and node form consistent with an embodiment of the present invention.

FIG. 3 is a diagram that illustrates an exemplary node step and node form. For example, at the first node the Customer Contact Associate (online representative) ("CCA") may choose which form the representative would like to create. A form controller, as described below, may handle the form display. At this node, the process flow may have different node steps to handle the display of the forms, as shown in FIG. 3. Node form and node step are described in greater detail below with respect to FIG. 5.

Figure 4:
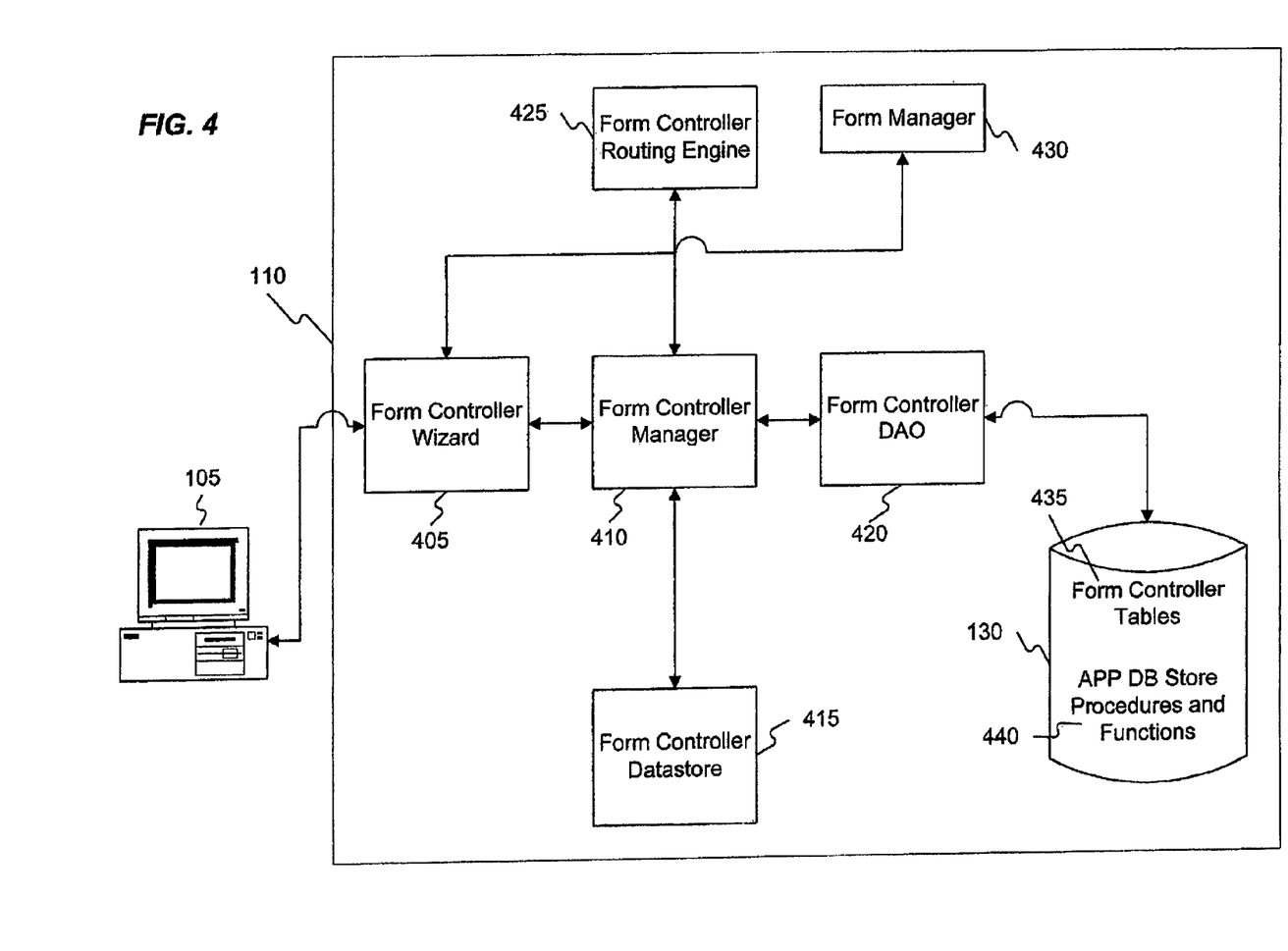
FIG. 4 is a functional block diagram of an exemplary system for defining a form navigational structure consistent with an embodiment of the present invention.

FIG. 4 is a functional block diagram of an exemplary system for defining a form navigational structure consistent with an embodiment of the present invention. FIG. 4 illustrates in more detail an exemplary embodiment of form controller processor 110. As shown in FIG. 4, form controller processor 110 may comprise, a form controller wizard 405, a form controller manager 410, a form controller data store 415, a form controller data access object (DAO) 420, a form controller routing engine 425, and a form manager 430.

Form controller wizard 405 may comprise a front-end interface component on a browser for user 115 to define form navigation/flow. Form controller manager 410 may comprise main back-end components for a form displaying controller that may control transaction to other form controller components within processor 110.

Form controller data store 415 may comprise back-end components that may store routing and other information to memory 130. Form controller data store 415 may reduce database traffic and speed up the system's performance. Form controller DAO 420 may comprise back-end components that may interact with databases for storing and retrieving transaction data in memory 130, for example. Memory 130, for example, may hold database components including tables 435, which may hold master routing structures and transactions tables, and DB store procedures and function 440.

Form controller routing engine 425 may comprise a main backend component that may control the business rules and fields validation that may define the navigation flow of the forms. Form manager 430 may comprise a component that may return form entity structures.

Figure 5:
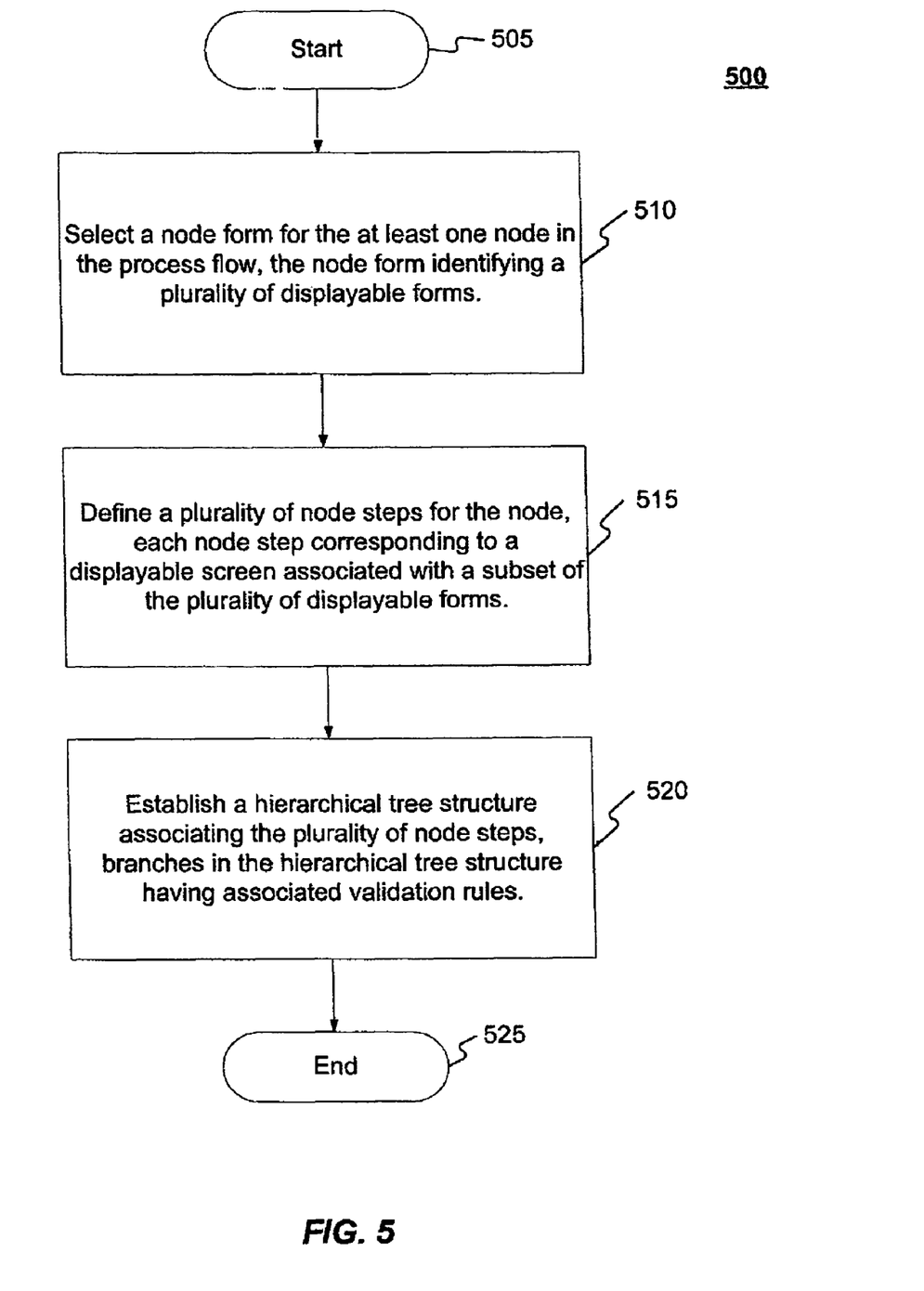
FIG. 5 is a flow chart of an exemplary method for defining a form navigational structure consistent with an embodiment of the present invention.

FIG. 5 is a flow chart setting forth the general stages involved in an exemplary method for defining a form navigational structure associated with at least one node in a process flow. Exemplary ways to implement the stages of method 500 will be described in greater detail below. Exemplary method 500 may begin at starting block 505 and proceed to stage 510 where form controller processor 110, as directed by user 115 for example, may select a node form for the at least one node in the process flow, the node form identifying a plurality of displayable forms. For example, as illustrated in FIG. 3, form controller processor 110 may select node form 305. Node from 305 may identify a plurality of displayable forms including, for example, PIC form and Tax from.

Each of the plurality of displayable forms may include at least on user definable field. In addition, the node may comprise a location in the process flow configured to allow human intervention in the process flow. The plurality of displayable forms may be included in a ticket having other displayable forms. The ticket may be configured to pass through at least another node in the process flow. Furthermore, each of the plurality of displayable forms may have an access level defining a level of human intervention associated with each of the plurality of displayable forms. The access level may comprise create new, edit, view, and special. The special access level may comprise partial view and partial edit.

From stage 510, where processor 110 selects the node form for the at least one node in the process flow, exemplary method 500 may advance to stage 515 where form controller processor 110, as directed by user 115 for example, may define a plurality of node steps for the node, each node step corresponding to a displayable screen associated with a subset of the plurality of displayable forms. For example, for PIC form, processor 110 may define node step 310 as shown in FIG. 3. Similarly, for Tax from processor 110 may define node step 315, also shown in FIG. 3.

Once form controller processor 110 defines a plurality of node steps for the node at stage 515, exemplary method 500 may continue to stage 520 where form controller processor 110, as directed by user 115 for example, may establish a hierarchical tree structure associating the plurality of node steps, branches in the hierarchical tree structure having associated validation rules. For example, user 115 may enter the validation rules for showing the next step screen in the process flow, which may define form navigation in the process flow based on business rules. If there is a navigation flow for forms, the flow may be displayed in the hierarchical tree structure. After form controller processor 110 establishes the hierarchical tree structure associating the plurality of node steps at stage 520, exemplary method 500 ends at stage 525.

Figure 6:
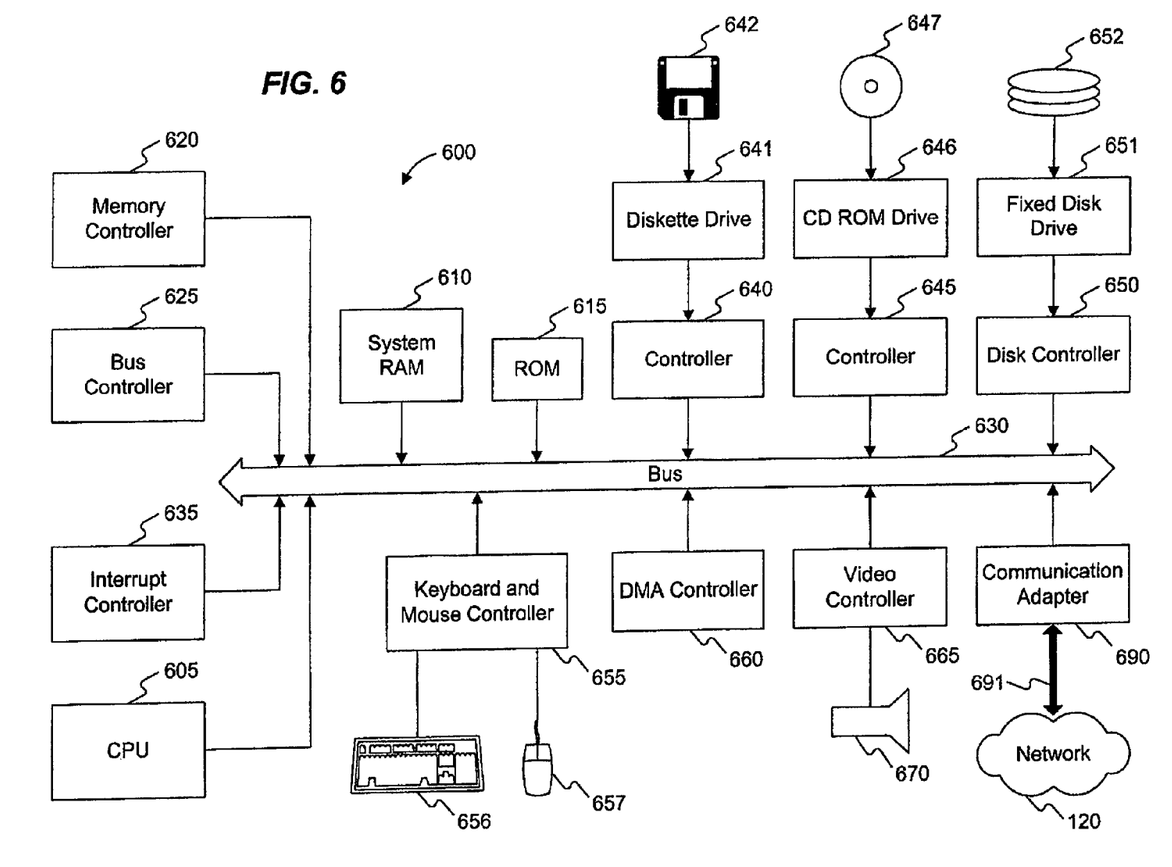
FIG. 6 is a functional block diagram of an exemplary computer system consistent with an embodiment of the present invention.

FIG. 6 is a functional block diagram of an exemplary computer system consistent with an embodiment of the present invention with which the invention may be implemented. Consistent with an exemplary embodiment of the present invention, the processors, as described above including, user processor 105 and form controller processor 110, may comprise, be disposed, or implemented within computer system 600. Although the description may refer to terms commonly used in describing particular computer systems, such as a personal computer, the description and concepts equally apply to other computer systems, such as network computers, workstations, and even mainframe computers having architectures dissimilar to FIG. 6.

Computer system 600 includes a central processing unit (CPU) 605, which may be implemented with a conventional microprocessor, a random access memory (RAM) 610 for temporary storage of information, and a read only memory (ROM) 615 for permanent storage of information. A memory controller 620 controls the RAM 610.

A bus 630 interconnects the components of computer system 600. A bus controller 625 controls the bus 630. An interrupt controller 635 receives and processes various interrupt signals from the system components.

Mass storage may be provided by diskette 642, CD ROM 647, or hard disk 652. Data and software may be exchanged with computer system 600 via removable media such as diskette 642 and CD ROM 647. Diskette 642 inserts into diskette drive 641 which, in turn, connects to bus 630 via a controller 640. Similarly, CD ROM 647 inserts into CD ROM drive 646 which, in turn, connects to bus 630 via controller 645. Hard disk 652 is part of a fixed disk drive 651 that connects to bus 630 by controller 650.

User input to computer system 600 may be provided by a number of devices. For example, a keyboard 656 and mouse 657 connect to bus 630 via controller 655. In addition, other input devices, such as a pen, a tablet, or speech recognition mechanisms, may connect to bus 630 and an appropriate controller and software. A direct memory access (DMA) controller 660 performs direct memory access to RAM 610. User output may be generated by a video controller 665 that controls video display 670.

Computer system 600 also includes a communications adaptor 690 that allows the system to be interconnected to additional computing resources via a local area network (LAN) or a wide area network (WAN), such as the Internet, schematically illustrated by bus 691 and network 120. Signals traveling through network 120 can generally be referred to as "carrier waves" that transport information. Although aspects of the present invention are described as being stored in memory in the form of instructions, those aspects may be stored on other computer-readable media, such as secondary storage devices like hard disks, floppy disks, or CD ROM, or other forms of RAM or ROM, or a carrier wave.

Operation of computer system 600 is generally controlled and coordinated by operating system software. The operating system controls allocation of system resources and performs tasks, such as memory management, process scheduling, networking, and services, among other things.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, hard disks, floppy disks, a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification be considered as exemplary only, with a true scope and spirit of the invention being indicated by the following claims and their full scope of equivalents.

What is claimed is:

1. A method for defining a form navigational structure associated with a node in a process flow, the method comprising:
 selecting a node form for the node in the process flow, the node form identifying a plurality of first displayable forms included within a ticket, the ticket being routed through the process flow from the node to another node, wherein the node comprises a location in the routing of the ticket that receives human intervention in the process flow;
 defining a plurality of node steps for the node, the node steps corresponding to displayable screens associated with subsets of the first displayable forms; and
 establishing a hierarchical tree structure associating the plurality of node steps,
 wherein:
  branches in the hierarchical tree structure have associated validation rules, and
  the associated validation rules define a navigational flow through the node steps of the hierarchical tree structure.

2. The method of claim 1, wherein the first displayable forms include at least one user definable field.

3. The method of claim 1, wherein the validation rules are user definable.

4. The method of claim 1, wherein the validation rules comprise business rules associated with an enterprise using the process flow.

5. The method of claim 1, wherein the ticket comprises one or more second displayable forms, the ticket configured to pass through at least another node in the process flow.

6. The method of claim 1, wherein the first displayable forms have access levels defining a level of human intervention associated with the first displayable forms.

7. The method of claim 1, wherein the access levels comprise one of create new, edit, view, and special.

8. The method of claim 7, wherein special comprises partial view and partial edit.

9. A system for defining a form navigational structure associated with a node in a process flow, the system comprising:
 a memory storage for maintaining a database; and
 a processing unit coupled to the memory storage, wherein the processing unit is operative to:

select a node form for the node in the process flow, the node form identifying a plurality of first displayable forms included within a ticket, the ticket being routed through the process flow from the node to another node, wherein the node comprises a location in the routing of the ticket that receives human intervention in the process flow;

define a plurality of node steps for the node, the node steps corresponding to displayable screens associated with subsets of the first displayable forms; and establish a hierarchical tree structure associating the plurality of node steps, wherein:
    branches in the hierarchical tree structure have associated validation rules, and
    the associated validation rules define a navigational flow through the node steps of the hierarchical tree structure.

10. The system of claim 9, wherein the first displayable forms include at least one user definable field.

11. The system of claim 9, wherein the validation rules are user definable.

12. The system of claim 9, wherein the validation rules comprise business rules associated with an enterprise using the process flow.

13. The system of claim 9, wherein the ticket comprises one or more second displayable forms, the ticket configured to pass through at least another node in the process flow.

14. The system of claim 9, wherein the first displayable forms have access levels defining a level of human intervention associated with the first displayable forms.

15. The system of claim 9, wherein the access levels comprise one of create new, edit, view, and special.

16. The system of claim 15, wherein special comprises partial view and partial edit.

17. A non-transitory computer-readable storage medium storing a set of instructions that, when executed by a processor, perform a method for defining a form navigational structure associated with a node in a process flow, the method comprising steps performed by the processor of:

selecting a node form for the node in the process flow, the node form identifying a plurality of first displayable forms included within a ticket, the ticket being routed through the process flow from the node to another node, wherein the node comprises a location in the routing of the ticket that receives human intervention in the process flow;

defining a plurality of node steps for the node, the node steps corresponding to displayable screens associated with subsets of the first displayable forms; and establishing a hierarchical tree structure associating the plurality of node steps, wherein:
    branches in the hierarchical tree structure have associated validation rules, and
    the associated validation rules define a navigational flow through the node steps of the hierarchical tree structure.

18. The non-transitory computer-readable storage medium of claim 17, wherein the first displayable forms include at least one user definable field.

19. The non-transitory computer-readable storage medium of claim 17, wherein the validation rules are user definable.

20. The non-transitory computer-readable storage medium of claim 17, wherein the validation rules comprise business rules associated with an enterprise using the process flow.

21. The non-transitory computer-readable storage medium of claim 17, wherein the ticket comprises one or more second displayable forms, the ticket configured to pass through at least another node in the process flow.

22. The non-transitory computer-readable storage medium of claim 17, wherein the first displayable forms have access levels defining a level of human intervention associated with the first displayable forms.

23. The non-transitory computer-readable storage medium of claim 17, wherein the access levels comprise one of create new, edit, view, and special.

24. The non-transitory computer-readable storage medium of claim 23, wherein special comprises partial view and partial edit.

* * * * *